US009096777B2

(12) United States Patent
Bockmeyer et al.

(10) Patent No.: US 9,096,777 B2
(45) Date of Patent: Aug. 4, 2015

(54) COMPOSITE AND METHOD FOR THE PRODUCTION THEREOF

(75) Inventors: Matthias Bockmeyer, Mainz (DE); Eveline Rudigier-Voigt, Mainz (DE); Joerg Schuhmacher, Kornwestheim (DE); Volker Hagemann, Klein-Winterheim (DE); Franziska Back, Schweinfurth (DE)

(73) Assignee: SCHOTT AG, Mainz (DE)

( * ) Notice: Subject to any disclaimer, the term of this patent is extended or adjusted under 35 U.S.C. 154(b) by 615 days.

(21) Appl. No.: 13/364,528

(22) Filed: Feb. 2, 2012

(65) Prior Publication Data
US 2013/0034702 A1 Feb. 7, 2013

(30) Foreign Application Priority Data
Feb. 4, 2011 (DE) .......................... 10 2011 003 677

(51) Int. Cl.
*B32B 3/00* (2006.01)
*C09D 183/06* (2006.01)
*C03C 17/00* (2006.01)
*C03C 17/30* (2006.01)
*C23C 18/06* (2006.01)
*C23C 18/12* (2006.01)
*C23C 18/14* (2006.01)
*C08G 77/14* (2006.01)
*C08G 77/18* (2006.01)
*C08G 77/445* (2006.01)
*C08G 77/00* (2006.01)

(52) U.S. Cl.
CPC ............ *C09D 183/06* (2013.01); *C03C 17/006* (2013.01); *C03C 17/30* (2013.01); *C23C 18/06* (2013.01); *C23C 18/122* (2013.01); *C23C 18/127* (2013.01); *C23C 18/1245* (2013.01); *C23C 18/1254* (2013.01); *C23C 18/14* (2013.01); *C03C 2217/40* (2013.01); *C03C 2217/445* (2013.01); *C03C 2217/477* (2013.01); *C03C 2218/113* (2013.01); *C08G 77/14* (2013.01); *C08G 77/18* (2013.01); *C08G 77/445* (2013.01); *C08G 77/80* (2013.01); *C23C 18/1233* (2013.01); *Y10T 428/24612* (2015.01)

(58) Field of Classification Search
CPC .............. B32B 3/00; B32B 3/28; B32B 3/30; B32B 17/00; B32B 17/06; B32B 17/064; B32B 17/10; B32B 2383/00

USPC .................. 428/141, 156, 167, 172, 426, 429
See application file for complete search history.

(56) References Cited

U.S. PATENT DOCUMENTS

| | | | |
|---|---|---|---|
| 3,170,890 A | 2/1965 | Boyd et al. |
| 3,585,065 A | 6/1971 | Johnson |
| 3,701,815 A | 10/1972 | Matzner et al. |
| 4,076,695 A | 2/1978 | Keil |
| 4,107,148 A | 8/1978 | Fujiyoshi et al. |
| 4,879,344 A | 11/1989 | Woo et al. |
| 5,227,435 A | 7/1993 | Kang et al. |
| 2009/0256287 A1 | 10/2009 | Fu et al. |
| 2010/0048788 A1 | 2/2010 | Ogura et al. |
| 2010/0148378 A1 | 6/2010 | Katayama et al. |

FOREIGN PATENT DOCUMENTS

| | | |
|---|---|---|
| DE | 3535283 | 4/1987 |
| DE | 102005040046 | 3/2007 |
| DE | 102005051579 | 3/2007 |
| EP | 0103367 | 7/1983 |
| EP | 0212125 | 6/1986 |
| EP | 0444751 | 9/1991 |
| EP | 2133394 | 12/2009 |
| EP | 2196503 | 6/2010 |
| WO | 2009098915 A1 | 8/2009 |

OTHER PUBLICATIONS

Wu, Linda Y.L., et al., "A study towards improving mechanical properties of sol-gel coatings for polycarbonate," Singapore Inst. of Manufacturing Tech., Thin Solid Films, 516, Singapore, 2008, pp. 1056-1062.

H. Geßwein, "Entwicklung Hochfester Net Shape Oxidkeramiken Im System $Al_2O_3$-$SiO_2$-$ZrO_2$", Forschungszentrum Karlsruhe, Wissenschaftliche Berichte, FZKA7186, 2005, with English Translation, 8 pages.

Q. Liao et al., "A Hybrid Model to Determine Mechanical Properties of Soft Polymers by Nanoindentation", Mechanics of Materials 42 (2010) 1043-1047, 5 pages.

*Primary Examiner* — Catherine A Simone
(74) *Attorney, Agent, or Firm* — Ohlandt, Greeley, Ruggiero & Perle, LLP

(57) ABSTRACT

A composite is provided that has a structured sol-gel layer on a substrate. The sol-gel layer is extremely resistant against mechanical stress and other influences from outside due to its production method. The composite is suitable for use in a lot of technical fields, since the sol-gel layer can be provided with nearly any arbitrary structure. For example, the structure may result in optical effects and may be used in optical systems.

16 Claims, No Drawings

COMPOSITE AND METHOD FOR THE PRODUCTION THEREOF

CROSS REFERENCE TO RELATED APPLICATIONS

This application claims benefit under 35 U.S.C. §119(a) of German Patent Application No. 10 2011 003 677.6-43, filed Feb. 4, 2011, the entire contents of which are incorporated herein by reference.

BACKGROUND OF THE INVENTION

1. Field of the Invention

This invention relates to a composite with a substrate and a sol-gel layer applied to said substrate as well as a method for the production of the composite.

2. Description of Related Art

In prior art a lot of methods for providing substrates with coatings are known, in particular for incorporating structures to functionalize the substrates. Inter alia, the method of hot stamping is known in which a stamp die is brought into contact with a substrate surface at temperatures which are higher than the softening point of the substrate. In the case of a glass substrate, normally these temperatures are higher than 500° C. This method has the disadvantage that the wear of the forming tool results in high cost. Furthermore, only special substrates having a special melting and solidifying behavior can be used. In addition, the size of the structurable area as well as the plurality of the structures are strongly limited.

Another approach is to provide the substrate with a polymer layer to be structured. Then, the polymer layer may, for example, be structured by means of a stamp die. A substantial disadvantage of such polymer layers is their insufficient thermal stability due to the high portion of organic components. Often, such layers are stable only up to about 100 degrees Celsius (° C.).

Further, there is the method of sol-gel nano-imprint, wherein a stamp die is pressed into a sol-gel layer and subsequently thermal cross-linking is conducted. This method can hardly be used with rigid substrates in large areas. These processes are based on the thixotropic stamping method. In this case a thixotropic lacquer is structured, and the form thus obtained is conserved due to the thixotropic properties of the lacquer. Normally, the fixing action is conducted without contact with a stamp die in a thermal manner or via UV light. The high thixotropic properties of the lacquer are achieved by the addition of respective additives which normally affect the transmittance or the mechanical resistance as well as the pot life of the lacquer.

The stamping of solvent containing thin layer lacquers is also known. In this case, due to the high content of the solvent in the sol most often only layer thicknesses of up to 5 micrometers (μm) can be produced in an industrially realizable production step, due to the sub-optimal network forming and tension crack forming properties in the production of structured thick layers. Also, the produced thick layers are only stable at temperatures of up to about 200° C. respectively show cracks starting with a layer thickness of 5 μm at higher applied load temperatures.

Thus, there is a need for providing composites comprising structurable layers on a substrate which do not show cracks even in the case of higher layer thicknesses. These composites should be producible via an economic process and should have excellent temperature stability. In addition, they should be transparent so that they are suitable for optical applications.

SUMMARY OF THE INVENTION

The present invention solves the problems of prior art.

The composites according to the present invention can be produced by the method described below. Here, a substrate is provided with a coating composition to obtain a sol-gel layer.

DETAILED DESCRIPTION

The composite comprises a substrate which carries a sol-gel layer on at least one of its surfaces. This sol-gel layer is temperature-stable and structured. When the method steps described herein are conducted and when the composition of the coating composition is fulfilled, then a composite having the desired properties will be obtained. In this case, the sol-gel layer has a thickness of preferably at least 5 μm, more preferably at least 10 μm which is higher with respect to corresponding thicknesses in prior art. This becomes possible by the fact that the sol-gel layer has a modulus of elasticity of 200 to 10,000 Newtons per millimeter (N/mm$^2$), preferably of 500 to 10,000 N/mm$^2$, due to its composition and also due to the production method used. This property results in the advantage that the sol-gel layer do not show cracks even in the case of high applied temperature load.

The modulus of elasticity is achieved by a high degree of substitution of the inorganic network in the sol-gel layer. Preferably, for achieving this property temperature-stable siliconorganic compounds are used. Thus, a layer is produced, the shrinkage of which is very low in case of thermal load, whereby accordingly no shrinkage tensions are caused. Furthermore, a particular flexibility of the layer network is achieved and layer tension may relax.

In addition, the sol-gel layer preferably contains at least one polysiloxane. The polysiloxane supports the adjustment of the required elasticity. The portion of polysiloxane in the sol-gel layer should preferably be at least 10% by weight and at most 80% by weight, based on the sol-gel layer, further preferably at least 35% by weight and at most 65% by weight. According to the present invention, polysiloxanes comprise siloxane units having the following general formula (I):

$$R_nSiO_{(4-n)/2}\ (n=0, 1, 2, 3) \tag{I}$$

Thus, siloxane units may be mono-, di-, tri- and tetrafunctional. In symbol notation this may be described by the characters M (mono), D (di), T (tri) and Q (quatro): [M]= $R_3SiO_{1/2}$, [D]=$R_2SiO_{2/2}$, [T]=$RSiO_{3/2}$ and [Q]=$SiO_{4/2}$. The respective units are called M, D, T and Q units, respectively. Thus, a network constituted of Q units corresponds to the constitution of quartz glass.

A differentiation into the following groups is possible: linear polysiloxanes having the structure [MD$_n$M] respectively R$_3$SiO[R$_2$SiO]$_n$SiR$_3$ (e.g. poly(dimethylsiloxane)). Branched polysiloxanes having trifunctional or tetrafunctional siloxane units as branching elements. Structure [M$_n$D$_m$T$_n$]. In this case, the branching site(s) is/are located in a chain or a ring. Cyclic polysiloxanes have ringlike form consisting of difunctional siloxane units. Structure [Dn].

Here, the silicon atoms in the polysiloxane polymer may carry different substituents which are independently selected from each other. In this case, preferably the groups R are selected independently from each other from the group consisting of methyl, ethyl, propyl, butyl, pentyl, hexyl, phenyl and/or epoxy, vinyl, allyl as well as fluorinated alkyl; wherein methyl- and/or phenyl-substituted polysiloxanes are particularly preferable. In one polymer there may also be present different ones of the before-mentioned groups R. When these polysiloxanes are selected, then the elasticity of the sol-gel layer is further improved and thus a more resistant layer will be obtained. In particular, methyl- and/or phenyl-substituted organo-polysiloxanes provide a sol-gel layer with good heat resistance. Basically, there is one relationship: the higher the number of phenyl groups in the polysiloxane, the better the temperature resistance of the sol-gel layer.

In a particular embodiment according to the present invention the polysiloxanes are characterized by a high portion of T units of preferably >80%, particularly preferably >90%. Here, the numerical portion of the T units of all siloxane units in the polysiloxane molecule is meant. In a further embodiment according to the present invention the used polysiloxane is characterized by a portion of D units of about 5 to 40%. With the portion of the T and D units of the polysiloxane, inter alia, the E modulus according to the present invention of the layers may be adjusted. A higher portion of T units increases and a higher portion of D units decreases the E modulus.

In particular, according to the present invention also oligo, poly and/or polyhedral silsesquisiloxanes may be used as polysiloxanes.

Suitable polysiloxanes are described for example in U.S. Pat. Nos. 3,585,065; 4,107,148; 3,170,890 and 4,879,344. With this reference, the content of these publications is incorporated into this specification.

In a particular embodiment according to the present invention thermally resistant polyester-modified polysiloxanes are used as polysiloxanes. Such polyester-modified polysiloxanes are for example mentioned in DE 3 535 283, EP 0 103 367, U.S. Pat. No. 4,076,695, EP 0 444 751, U.S. Pat. Nos. 5,227,435, 3,701,815, EP 0 212 125, DE 10 2005 051 579.

Respective polyester-modified polysiloxanes are sold for example by Evonik Industries under the trade names Silikoftal HTT, Silikoftal HTL, Silikoftal HTL-2, Silikoftal HTL-3 and Silikoftal HTS. Thus, polysiloxanes are meant which have a polyester portion preferably being covalently bonded to the polysiloxane.

In this case, the content of polyester in the polyester-modified polysiloxanes may be 5 to 80% by weight, particularly preferably 20 to 70% by weight, particularly preferably 30 to 50% by weight, based on the solid content of the polysiloxane. With the polyester content of the polysiloxane also the E modulus of the polysiloxane-modified sol-gel layer may be adjusted. Preferably, in this case the portion of polyester of the polyester-modified polysiloxane consists of reaction products of epsilon-caprolactone, phthalic acid, trimethylolpropane, ethylene glycol, diethylene glycol, propylene glycol, glycerin, bisphenol A, pentaerythritol, trimethylolethane, trimethylolpropane glucose, 1,4-cyclohexanedimethanol, polyvinyl alcohol and/or neopentyl glycol.

In a preferable embodiment the mean molecular mass (number average) of the portion of polyester of the polyester-modified polysiloxane is between 1,000 and 50,000 g/mol, preferably between 1,500 and 30,000 g/mol, particularly preferably between 2,000 and 25,000 g/mol.

Furthermore, the layer shrinkage and thus the tendency to the formation of cracks of the structured layers can considerably be minimized by the use of polyester-modified polysiloxanes.

In a particular weatherproof embodiment according to the present invention, in the polyester-modified polysiloxane also linear dicarboxylic acids, such as for example adipic acid, are contained. With the addition of these linear carboxylic acids also the E modulus of the layer may be adjusted.

Preferably, the linear dicarboxylic acids are covalently bonded in the polyester; then they are a structure element of the polymer.

Also the incorporation of the polyester-modified polysiloxanes into the sol-gel network is conducted under heat by reaction with the alkoxy and/or hydroxyl groups of the polysiloxane network and/or polyester network. Here, during the reaction water or alcohol is eliminated and a covalent linkage of Si—O—Si and/or Si—O—C is formed.

In a particular embodiment according to the present invention the incorporation of the polysiloxanes into the sol-gel network is achieved via hydrogen bonds.

To guarantee the required temperature stability, typically the polysiloxane should have a degree of substitution of between 0.5 to 1.5, preferably 1.0 to 1.5. The degree of substitution means the mean number of alkyl and aryl substituents R according to formula (I) per silicon atom in the polysiloxane. Preferably, polysiloxanes are used which have a tendency to self-condensation at high use temperatures. For that a high hydroxyl functionality and/or functionalization with alcoholate groups is necessary which according to the present invention is 1 to 7.5% by weight hydroxyl and/or alcoholate groups, preferably 2 to 5% by weight, based on the polysiloxane. Furthermore, the high portion of hydroxyl and/or alcoholate group functionalities is necessary for a covalent bonding of the polysiloxane precursor via Si—O—Si linkages into the hybrid-polymeric sol-gel network.

For the adjustment of the optical layer properties according to the present invention it is important that the selected polysiloxane (resin or in solution) is compatible with the hybrid-polymeric sol-gel component. This preferably means that the polysiloxane is reactively incorporated into the sol-gel network via a condensation reaction.

In this case it is important that the polysiloxane is homogenously incorporated into the layer network and thus for example no phase separation and thus defects in the layers such as hazing, scattering, refractive index variations or layer inhomogeneities are caused. The present inventors have found that for this purpose in particular a special kind of polysiloxanes is suitable. In this case, the content of hydroxyl groups and the content of alcoholate groups in the siloxanes, the degree of cross-linking, the mean molecular mass, the content of $SiO_2$, the content of further organic additives, such as for example polyester, and the ratio of phenyl to methyl groups have to be considered.

In addition, the pot life and/or the screen printing ability and/or the residence time of the sol-gel precursor on the screen are affected by the selection of the polysiloxane. For that the content of the alcoholate groups, the content of the silanol groups, the portion of fluorine and/or epoxide groups of the used polysiloxane are important.

Further, the stampability of the sol-gel precursor and the achieved layer thickness are affected by the selection of the polysiloxane. Here in particular the portion of T and D units in the polysiloxane, the portion of polyester, the portion of fluorine and the portion of epoxide groups of the used polysiloxane are important.

For an optimum adjustment of the properties according to the present invention polysiloxanes should be used the viscosity of which is in the range of between 0.1 and 10 Pas, preferably between 2 and 5 Pas, at 150° C.

The preferable polysiloxanes have a content of hydroxyl and/or a content of alcoholate groups of 1.0 to 7.5% by weight, preferably 2 to 6% by weight, based on the weight of the polysiloxane.

Preferably, the ratio of phenyl to methyl in the used polysiloxane should be 1.0/1 to 2.7/1, more preferably 1.0/1 to 1.3/1 and most preferably 1.1/1 to 1.2/1.

Preferably, a mixture of polysiloxanes and/or polysilsesquisiloxanes is used. Particularly preferably, a mixture of polyester-modified polysiloxanes and/or phenyl/methyl-substituted polysiloxanes and fluorinated and/or epoxide-functionalized polysiloxanes is used. In this case, the portion of the fluorinated and/or epoxide-functionalized polysiloxanes in the total mass of polysiloxanes is preferably <5% by weight, particularly preferably <2% by weight. The portion of polyester-modified siloxanes in the total mass of polysiloxanes is preferably higher than 50% by weight, particularly preferably higher than 80% by weight.

Preferably, the glass transition temperature of the polysiloxane should be higher than 40° C., preferably even higher than 45° C. To minimize the shrinkage of the first layer during the production, a polysiloxane should be used which contains 0.2% by weight or less of organic solvents, preferably even 0.1% by weight or less of organic solvents.

Preferably, here a polysiloxane resin is used. In addition, this resin is characterized in a particular embodiment by a content of $SiO_2$ of 50% by weight to 65% by weight, preferably 50% by weight to 55% by weight, determined after thermal load at 700° C. In a special embodiment according to the present invention the content of $SiO_2$ of the polysiloxane may also be 75% by weight to 85% by weight. In this case, the content of $SiO_2$ is determined by the pyrolyse loss after a thermal treatment at 1,000° C. for 1 h. For example, this determination may also be conducted by the method of thermography which is known by a person skilled in the art. A suitable method may for example be found in H. Geβwein, "Entwicklung hochfester Net shape Oxidkeramiken im System $Al_2O_3$—$SiO_2$—$ZrO_2$", Forschungszentrum Karlsruhe, Wissenschaftliche Berichte, FZKA7186, 2005.

In a particular embodiment the preferable mean molecular mass of the used polysiloxane and/or polysilsesquisiloxane is between 1,500 and 300,000 g/mol, preferably between 2,000 and 5,000 g/mol and/or between 200,000 and 300,000 g/mol and/or of 1,500 to 2,500 g/mol. In other words, also mixtures of different polysiloxanes having different molecular weights may be added. If nothing else is indicated herein, the mean molecular mass is supposed to be the number average $M_n$.

The composite may be produced by a method which comprises the following steps: coating a substrate with a coating composition so that at least on one surface of the substrate a primary layer is obtained, and curing the layer to obtain a sol-gel layer.

During the curing of the layer the sol-gel conversion takes places during which the coating composition (the sol) is converted into the gel. Subsequently, optional further curing steps may follow which are described below.

The advantage of this method with respect to prior art methods inter alia is that with the described method a method is available which allows a great freedom of design. It facilitates the provision of layers also on locally limited areas, finely structured or as a complete area on a rigid material, such as glass or glass ceramic. And this method can be conducted with reproducible results and allows the production of identical articles with respective structured layers.

Before curing the sol-gel layer on the substrate thus produced is provided with a structure. This is preferably conducted with the help of a stamp die which is described below.

In a preferable embodiment of the method according to the present invention this method further comprises the step of: coating the sol-gel layer with a functional layer.

The functional layer may provide the sol-gel layer with further properties in the sense of a surface functionalization. This may for example be achieved by coating with a hydrophobic coating solution. So the effect is achieved that the surface thus coated is provided with improved dirt-repellent properties. It is also possible to coat the sol-gel layer with a metal layer or a lacquer layer.

As described above, the sol-gel layer is modified by the incorporation of a structure. Preferably, with this method structures with optical functions are incorporated, such as diffractive or refractive structures.

The sol-gel layer in the composite may be structured such that a depth of the structure of higher than 5 μm, preferably higher than 20 μm and particularly preferably up to 200 μm, further preferably 10 μm to 50 μm is achieved.

An embodiment of the sol-gel layer according to the present invention preferably withstands temperature loads of at least 170° C., in particular 220° C. and preferably even 250° C. at least for 10 minutes. The sol-gel layer has a high layer thickness to facilitate the depths of the structures. It is surprising that with the material according to the present invention and the method according to the present invention such high layer thicknesses which are free of cracks and temperature-stable can be produced. Primarily, this is achieved by the composition of the sol-gel layer which in turn can be achieved by the use of a suitable coating composition and strict adherence of the method according to the present invention.

The composite according to the present invention does not only have high temperature stability, but does not discolor also under the exposure of temperatures of for example 250° C., but retains its optical properties. In an embodiment according to the present invention this feature can be explained, inter alia, by the use of a polyester-modified polysiloxane.

Furthermore, the composite is particularly weather and UV resistant due to its hybrid-polymeric composition and the siloxane modification.

With the structuring of the surface and the variation of the composition of the sol-gel layer can be achieved that the layer is provided with dirt-repellent properties.

The sol-gel layers are designed such that they have high adhesiveness to the substrate. Thus, an adhesive is not required and according to the present invention preferably no further layer, in particular no adhesive layer, is present between the substrate and the sol-gel layer.

Due to the composition of the sol-gel layer this layer is a dense layer which is nearly free from pores. Nearly free from pores means that the layer has a porosity of lower than 10% by volume, preferably lower than 5% by volume, particularly preferably lower than 2% by volume.

The method according to the present invention has the advantage that it needs only very small amounts of organic solvents which has positive effects with respect to environmental compatibility and safety at work. Furthermore, with the coating composition of the sol described below it is guaranteed that sufficient process stability due to the optimization of the pot life of the sol is achieved.

When the method according to the present invention is used, then a structure reproducibility of higher than 80%, preferably higher than 90% with respect to the master piece which is described below can be achieved.

The reason for the excellent properties of the sol-gel layer is that it comprises a hybrid-polymeric sol-gel material preferably modified with a polysiloxane. Thus, the particular properties with respect to the modulus of elasticity, but also the surface energy, the mechanical and chemical resistance and the possible transparency are achieved. Furthermore, this method may be used in industry so that the composites can be produced in a cost-effective manner.

The sol-gel layer can be applied in large areas very easily—as can be seen from the method described below. Preferably, even the whole surface of the substrate is provided with the sol-gel layer. Here, the size of the area to be coated is preferably at least 0.1 m$^2$, further preferably at least 0.25 m$^2$. Preferably, the sol-gel layer is provided with a structure on the whole surface thereof which preferably has been incorporated according to the method described below. In preferable embodiments the structured area has a size of at least 0.1 m$^2$, further preferably at least 0.25m$^2$.

Preferably, the substrates are rigid substrates. Rigid substrates are substrates which often consist of brittle breaking materials such as for example polymers, glass, ceramic or glass ceramic. Generally, rigid substrates are glasses, ceramics and glass ceramics having thicknesses of the substrate of preferably 0.3 to 100 mm, further preferably 10 to 50 mm. These may for example be iron containing or iron reduced soda-lime glasses, corrosion resistant glasses, such as borosilicate glass, aluminosilicate glass or alkali reduced glasses, optical glasses having specially adjusted optical dispersion properties, such as for example being sold by Schott AG or Corning, or transparent or volume-colored glass ceramics. In this case, rigid substrates may be chemically or thermally tempered.

In a particular embodiment the substrate may be a tube or an already curved substrate having a radius of curvature of 0.05 to 1,000 m, preferably 1 to 50 m.

The refractive structures which are preferably present in the sol-gel layer have preferably a depth of the structure of higher than 5 μm. When diffractive structures are incorporated, preferably they have a depth of the structure of higher than 0.2 μm. Preferably, the sol-gel layers have refractive and diffractive structures.

When structures with a decorative function are incorporated into the sol-gel layer, then they have a stochastic roughness with a depth of the structure of 200 nm to 100 μm. When a brush-finished surface is produced, then the stamping has a depth of the structure of smaller than 5,000 nm, preferably smaller than 3,000 nm, particularly preferably smaller than 1,500 nm.

"Depth of the structure" means the mean depth of the structure stamped into the layer. Preferably, the sol-gel layer has a macroscopic lateral structure which can be applied by means of screen printing, tampon printing, inkjet printing or offset printing in a cost-effective manner. Here a lateral structure means that the lacquer has been applied only locally onto the substrate and that this lacquer has been structured later by the stamping method. Thus, due to the coating method the substrate surface is not completely coated and thus also not completely structured. In this case, the lateral resolution of the structure is >10 μm, particularly preferably >20 μm, especially particularly preferably >100 μm due to the resolution of the coating method used. The lateral resolution of the screening method which typically can be achieved is >20 μm.

The sol-gel layer according to the present invention is designed such that it can be prepared in one single coating step, preferably by means of screen printing. In preferable embodiments the layer is stamped, thus has a stamping.

For the incorporation of structures preferably at first a master piece is prepared, as is described below.

When the sol-gel layer should be structured by a stamping step, then a stamp die is necessary. The production of the stamp die requires according to the present invention the use of a so-called master piece. The master piece is an article which carries the structure to be realized later in the sol-gel layer. Thus, the master piece is the basis for the form of the structure of the sol-gel layer. Thus it is guaranteed that also in the case when a stamp die has become worn-out in the course of time an identical stamp die can again be produced starting from the master piece. Therefore, it preferably consists of a durable material, such as for example of metal.

In an alternative way, of course also a stamp die may simply be prepared by directly incorporating the structure of the sol-gel layer to be realized in negative form into a green stamp die body. In this way, in a simple manner a model can be formed which preferably has been cleaned before.

Preferably, the master piece should be cleaned before use so that it is free of dust and fluff. For the production of the stamp die, preferably then the master piece is brought into contact with the polymer mass, so that the structure of the master piece is transferred to the polymer mass. In preferable embodiments the polymer mass is cast onto the clean master piece. Preferably, the polymer mass is a silicone molding material. After the transfer of the master structure to the polymer mass, preferably the mass is hardened. The hardening is conducted by the use of methods which are known by a person skilled in the art, preferably however by the use of heat.

Sometimes, complex structures may include bubbles between the polymer mass and the master piece. Preferably, they are removed by the use of low pressure. The stamp die thus obtained is removed from the model and normally can be used immediately. After a step of stamping these stamp dies can be cleaned by means of normal cleaning solutions, in particular with ethanol or isopropanol, and used again.

In a step of coating the substrate a coating composition is applied which forms the primary layer. The coating composition is a sol, thus preferably a colloid dispersion. After sol-gel conversion the coating composition may form a solid layer on the substrate. The step of coating the substrate can be realized in a continuous and cost-effective precipitation method which thus is suitable for production. This can be realized with a method in which the primary layer of the coating composition, thus the sol-gel layer, is applied on one side of the surface of the substrate by means of a liquid coating method. The possible liquid coating methods are known by a person skilled in the art.

In a preferable embodiment the coating composition is designed such that it can be applied by means of screen printing. So a partial application of the primary layer is facilitated. This results in a significant advantage: by the fact that areas which should not be provided with the sol-gel layer can be maintained and free areas which are often required for display uses, touch uses or bonded joints do not contain a structured layer, in these areas no time-consuming control of layer unevenness, inhomogeneities and impurities is necessary.

As the coating method one-sided screen printing, tampon printing, dip coating, roll coating, flow coating, coating with a doctor knife, spraying or other normal liquid coating technologies may be used. The substrates may be coated one-sided, two-sided or multiple-sided. Screen printing is particularly preferable because therewith an already laterally structured primary layer can be applied.

The coating composition optionally comprises particles, wherein preferably the particles are nanoparticles. The particles may be of amorphous, hybrid or crystalline kind. According to the present invention also mixtures of different kinds of particles may be used. With the material composition of the particles, inter alia, an adjustment of the refractive index of the structured layer with respect to the substrate and/or the functional layer may be realized. In preferable embodiments the particles are selected such that the structured layer itself is functionalized so that preferably no separate functional layer is necessary any longer. So for example it is possible to incorporate conductive particles to prevent electrostatic charge. In a further embodiment in the structured layer hydrophobic particles are contained. In a further embodiment the structured layer is photocatalytically active and/or the refractive index of the layer is adjusted in a targeted manner due to the addition of titanium oxide ($TiO_2$). Particularly preferable are silicon dioxide ($SiO_2$) particles, because with their use a shrinkage of the structure of only 0 to 25%, based on the depth of the structure of the master piece, can be achieved. Of course, in preferable embodiments the particles which can be added to the coating composition are contained in the sol-gel layer of the composite.

Preferably, the particles have an irregular form and/or the form of a fiber. Preferably, the particles have diameters of 5 to 15 nm and preferably lengths of 5 to 150 nm. In an alternative, also particles having different sizes of 5 to 125 nm can be used. The particles may also have the form of spheres. Unless indicated otherwise, in this specification the information given with respect to the size of particles means the diameter according to Ferret, determined according to the method of dynamic light scattering.

The coating composition comprises sol-gel precursors. Preferably, alkoxysilanes are used as sol-gel precursors. Preferable are alkoxysilanes which are functionalized with organically cross-linkable groups. Particularly preferably these are epoxy-functionalized and methacrylate-functionalized alkoxysilanes. For a special embodiment according to the present invention, particularly preferable UV excitable radically polymerizable hybrid-polymers are used.

Preferable, the coating composition comprises amorphous or hybrid-polymeric $SiO_2$.

In a particular embodiment inorganic $SiO_2$ nanoparticles are added to the coating composition. Preferably, the portion by volume of the nanoparticles of the coating composition is higher than 10%, further preferably higher than 20%. Preferably, the nanoparticles are added as an alcoholic dispersion.

Preferably, the coating composition also comprises particles in the form of amorphous or nano-crystalline metal oxides and/or metal fluorides. Preferable metal oxides are titanium dioxide (anatase and/or rutile, $TiO_2$), zirconium dioxide ($ZrO_2$), $Y_2O_3$ stabilized zirconium oxide, aluminium oxide (boehmite, alpha-$Al_2O_3$, gamma-$Al_2O_3$), zinc oxide (ZnO), indium tin oxide (ITO), magnesium fluoride ($MgF_2$) and calcium fluoride ($CaF_2$). Preferably, also their hybrid-polymeric derivates or compounds can be used. The metal oxides may be present in the form of particles. In particular, the coating composition comprises sol-gel precursors of silicon, titanium, zirconium, aluminium, zinc, magnesium, calcium, tin or mixtures thereof. Particularly preferable are the sol-gel precursors $SiOR_xR_y$, $TiOR_xX_y$, $ZrOR_xX_y$, $AlOR_xX_y$, $ZnOR_xX_y$, $MgOR_xX_y$, $CaOR_xX_y$ and $SnOR_xX_y$. Here, R and X mean alkyl and/or aryl groups. The indices x and y are integers, preferably independently selected from each other, of 0 to 3, in particular 0 to 2.

In an embodiment the particle size of the sol-gel precursor is in a range of 0.05 to 200 nanometers (nm), particularly preferably of 1 to 100 nm. Here in particular the form of the particles may be spherical and/or also irregular.

In a particular embodiment according to the present invention nanoparticles having a high refractive index of higher than 2.1, particularly preferable of higher than 2.3 are added to the polysiloxane-modified sol-gel precursor. For example, anatase has a refractive index of higher than 2.5 and rutile has a refractive index of higher than 2.7. In this case the portion by mass of amorphous and/or crystalline particles, based on the total content of solids in the layer, is preferably higher than 5% by weight, particularly preferably higher than 10% by weight.

In a particularly preferable embodiment as a sol-gel precursor the coating composition comprises a UV curable hybrid-polymeric, hydrolyzed and condensed alkoxysilane precursor, in particular glycidylpropyltriethoxysilane and/or glycidylpropyltrimethoxysilane and/or methacryloxypropyltriethoxysilane and/or methacryloxypropyltrimethoxysilane and/or methacryloxypropylmethyldiethoxysilane and/or methacryloxypropylmethyldimethoxysilane which are functionalized with polysiloxanes. Preferably, methyl- and/or phenyl-functionalized polysiloxanes are used. Thus preferably, the sol-gel layer on the substrate comprises the reaction products of sol-gel precursors which are described herein, in particular alkoxysilanes, with polysiloxanes which are described herein.

Here, preferably as the sol-gel precursor a hybrid-polymer which is derived from a sol-gel is used which has been obtained from a reaction of a silane having the general formula $R^1Si(OR)_3$ and optionally $R^2Si(OR)_3$ or $R^1R^2Si(OR)_2$ with a tetraalkoxysilane having the general formula $Si(OR)_4$ in the context of an acidic hydrolysis and condensation reaction. Preferably, $R^1$ is a UV curable organic function, preferably a radically polymerizable function, especially preferably a methacrylate-based function. OR is an alcoholate group, preferably ethylate. $R^2$ is an aromatic or aliphatic organic group, preferably methyl and/or phenyl. Preferably, the sol-gel precursor is characterized in that the ratio of T to Q units is 3:1 to 5:1, preferably 3.5:1 to 4.5:1. In the preferable embodiment the sol-gel precursor is characterized in that it does not contain M and/or D units.

The use of polysiloxanes in the coating composition results in a more elastic sol-gel layer. The reason for that may be that the degree of cross-linking of the sol-gel layer is lower than in the case of the use of monomeric precursors without the addition of polysiloxanes. Already before, the polysiloxanes have been polymerized to large molecules, and therefore they disturb the otherwise strongly cross-linked structure in the sol-gel layer. Also, the polysiloxane precursors have a high portion of T and/or D units. Probably, this is the reason for the elasticity and temperature resistance according to the present invention of the sol-gel layers of this invention.

Particularly preferable further hybrid-polymeric sol-gel precursors are vinyl silanes, allyl silanes, urethane silanes and mixtures of these precursors. From the vinyl silanes particularly preferable are vinyl alkoxysilanes, in particular vinyl triethoxysilane and/or vinyl trimethoxysilane. From the allyl silanes particularly preferable are allyl alkoxysilanes, in particular allyl triethoxysilane and/or allyl trimethoxysilane. From the urethane silanes particularly preferable are dimethacrylate urethane alkoxysilanes, in particular glycerol-1,3-dimethacrylate urethane triethoxysilane.

In preferable embodiments one or more amino-functionalized silanes are added to the coating composition. Preferable amino-functionalized silanes are 3-aminopropyltrimethoxysilane, [3-(methylamino)propyl]trimethoxysilane, [3-(phenylamino)propyl]trimethoxysilane, [3-(diethylamino)propyl]trimethoxysilane, 3-[2-(2-aminoethylamino)ethylamino]propyltrimethoxysilane, N-[3-(trimethoxysilyl)propyl]ethylene diamine, 1-[3-(trimethoxysilyl)propyl]urea, bis(3-(methylamino)propyl)trimethoxysilane and mixtures of these components. Amino-functionalized silanes improve the cross-linking of the layer and the adhesion of the layer at the substrate.

Furthermore, the coating composition may comprise one or more mercaptosilanes. Mercaptosilanes improve the adhesion of the layer at the substrate.

In a preferable embodiment the coating composition comprises polyfunctional organic monomers and/or organo-silanes. Preferably, these monomers have 2 or 3 or 4 organically cross-linkable functional groups. Preferable substances of this group are bismethacrylates, bisepoxides, bismethacrylate silanes, bisepoxide silanes, bismethacrylate urethane silanes and mixtures of these substances.

The following substances or mixtures thereof are particularly preferable: triethylene glycol dimethacrylate, diethylene glycol dimethacrylate, tetraethylene glycol dimethacrylate, ethylene glycol dimethacrylate, polyethylene glycol dimethacrylate, butanediol dimethacrylate, hexanediol dimethacrylate, decanediol dimethacrylate, dodecanediol dimethacrylate, bisphenol-A dimethacrylate, trimethylolpropane trimethacrylate, ethoxylated bisphenol-A di-methacrylate, bis-GMA (2,2-bis-4-(3-methacryloxy-2-hydroxypropyl)phenylpropane) and 3,4-epoxycyclohexylmethyl-3,4-epoxycyclohexane carboxylate as well as reaction products of iso-cyanates, in particular di- and/or triisocyanates, with methacrylates containing OH groups.

For example, these may be the reaction products of 1 mol hexamethylene diisocyanate with 2 mol 2-hydroxyethyl methacrylate, of 1 mol (tri(6-isocyanatohexyl)biuret with 3 mol hydroxyethyl methacrylate or of 1 mol trimethylhexamethylene diisocyanate with 2 mol hydroxyethyl methacrylate. These compounds are also called urethane dimethacrylates.

As preferable polysiloxanes branched polysiloxanes are used. Particularly preferably, trifunctional and/or tetrafunctional polysiloxanes are used. Also preferable are cyclic polysiloxanes and/or polysiloxanes having the form of a ring.

In a particular embodiment, to the coating composition so-called polysilsesquisiloxane compounds (POSS) may be added as polysiloxane.

The portion of polysiloxane of the sol-gel layer should preferably be at least 10% by weight and at most 80% by weight, based on the sol-gel layer, further preferably at least 35% by weight and at most 65% by weight.

So that the coating compositions are environmentally friendly, safe and capable of being applied by screen printing, preferably they have a content of solvent of not higher than 20% by weight, further preferably lower than 10% by weight. Preferably, here solvents having a low vapor pressure of (at room temperature) lower than 2 bar and/or a boiling point of higher than 120° C. are used. A preferable solvent is diethylene glycol monoethylether. For that for example in the production of the coating compositions an exchange of the solvent from volatile alcohols to diethylene glycol monoethylether is conducted. So it is achieved that in the screen printing method during the continuous application of the coating composition the screen will not be clogged. However in preferable embodiments the coating composition is free of solvent.

Preferable, additives are added to the coating solution for preventing defects, layer unevenness, phase separation effects, bubbles and/or foaming. These additives may sum up to 5% by weight, preferably up to 2% by weight of the coating solution. Preferable additives are deaerators, antifoaming agents, leveling agents and dispersing agents. They can commercially be sold, for example, from the company TEGO (EVONIK) and they are known as typical lacquer additives by a person skilled in the art. Specifically, they are pure and/or organically modified (with low molecular weight) polysiloxanes, organic polymers, fluorine-functionalized polymers, polyether-modified polysiloxanes, polyacrylates and/or basic or acidic fatty acid derivatives.

In a particular embodiment the coating composition may also contain UV or thermally cross-linking organic or hybrid-polymeric components. To initiate the radiation-based polymerization, most often a UV initiator is added to the coating composition. These photoinitiators which are known by a person skilled in the art are, for example, prepared under the trade name Irgacure by the company BASF. In a preferable embodiment according to the present invention radical photoinitiators are used which can be excited by wavelengths of higher than 300 nm by means of UV radiation.

When the coating composition described herein is used, then thick films can be applied onto the substrate which nearly do not show any shrinkage with respect to the applied wet film thickness, since they only contain low amounts of solvents or no solvent at all.

With some coating compositions it is advisable to pre-cure the primary layer briefly, wherein preferably the pre-curing treatment takes place by photochemical processes. This is in particular an advantage, when subsequently a curing treatment via UV light is envisaged. But this pre-curing treatment may also be realized by thermal treatment, in particular by means of an IR radiating facility.

When the first layer should be structured, then onto the primary layer a stamp die is applied. This may be conducted in a continuous or static manner. In one embodiment the stamp die may be provided with a sol-gel layer. The stamp die will press the desired structure into the primary layer.

Preferably, in this step the stamp die is pressed onto the primary layer with a contact pressure of 0.01 to 5 bar. In a particular embodiment this step is conducted under vacuum.

Now, during the optional structuring, a composite comprising at least the components substrate, primary layer and stamp die is present. Here, preferably a pressure is applied onto the composite so that the components are pressed onto each other. Then the primary layer is cured.

Preferably, the curing treatment is conducted in a thermal and/or photochemical manner. The photochemical curing treatment is particularly preferable. In another embodiment no pressure is applied onto the composite, since the coating composition of the layer to be structured which is still liquid before the curing treatment is drawn into the structure of the stamp die by itself.

In an optional method step bubbles are removed by hand, with a roll or by means of low pressure, wherein in this case the low pressure is lower than 900 mbar. By this curing step the structured layer becomes solid so that the stamp die can be removed.

As explained above, the structuring step using the stamp die is an optional step. It is conducted only, when the sol-gel layer should carry a structure. When no structure is desired, of course the primary layer may be dried without a stamp die to obtain a sol-gel layer without structure.

When the curing of the first layer is conducted in a thermal manner, then the temperature is in a range of 50 to 150° C. The photochemical curing is conducted by means of a UV light source having a maximum emission at a wavelength of 200 to 400 nm.

In particular embodiments already during this step the hardening treatment may be conducted. This means that no further step of hardening is necessary. This curing may be conducted by UV light.

After curing or optionally hardening the stamp die, if used, will be removed again. After the removal of the stamp die the sol-gel layer is present in the form of a structured thick layer. Preferably, the layer thickness of the sol-gel layer is about up to 200 µm. The structures which are obtained in the structured layer are defined by the structure of the stamp die.

Preferably, the layer thickness of the sol-gel layer is at least 5 µm, preferably at least 10 µm and more preferably at least 20 µm.

Optionally, the sol-gel layer is hardened after the removal of the stamp die. In particular, it is thermally hardened, when the first curing step has been conducted with UV light. Here, besides a further advantageous cross-linking of the organic monomers primarily also a further cross-linking (condensation) of the hydroxyl groups (inter alia with the elimination of the alkoxide groups) of the Si—O network takes place. So, primarily an advantageous covalent linkage of the polysiloxane network with the sol-gel network is achieved. Preferably, this cross-linking reaction is conducted at temperatures of between 150 and 300° C., particularly preferably at temperatures of between 220 and 270° C.

In alternative embodiments the temperature at which the hardening is conducted is preferably in a range of 50 to 1,000° C., further preferably at 100 to 500° C. When organic components of the sol-gel layer should be burned out, then the temperature is adjusted to at least 250° C., preferably >300° C., particularly preferably >500° C. It has been shown that the structure will be maintained, also in the case that the organic components are completely burned out. The shrinkage of the structure relative to the structure of the master piece decreases with decreasing reprocessing temperature and increasing particle content of the coating composition in an amount of between 0 and 60%. However, the shrinkage of the structure can be compensated with a structure of the master piece the depth of which is somewhat higher than the final desired structure in the sol-gel layer.

In a particular embodiment the method is characterized in that the hardening of the sol-gel layer is conducted in a thermal manner in a temperature range of 100 to 1,000° C., particularly preferably in a temperature range of between 450 and 740° C.

The composition of the sol-gel layer is characterized in that is contains at least 25 to 100% by weight, particularly preferably 40 to 80% by weight, especially preferably 45 to 65% by weight of $SiO_2$. In a special embodiment according to the present invention the content of $SiO_2$ is 50 to 58% by weight. In this case, the content of $SiO_2$ means the residual solid content of $SiO_2$ after a thermal treatment of the structured layer material at 700° C. for 1 hour.

The preferable depth of the structures in the structured sol-gel layer varies in a range of 1 µm to 100 µm, preferably of 4 µm to 40 µm, particularly preferably of 10 to 30 µm. Periodic or statistic structures may be used as structures, wherein preferable structures are lens structures, sinusoidal structures, refractive line grids, refractive cross grids, diffractive line grids, diffractive cross grids, diffractive moth eye structures, diffractive optical elements, numbers, codes, in particular barcodes and/or product codes, pyramidal structures, inverted pyramidal structures, safety features, holographic structures, uncoupling structures for OLEDs or for LEDs, scattering structures for light elements and/or light guide structures for day light for storefronts or ceiling elements. But there can also be reproduced lines of a brush-finished surface, scattering layers of different kinds and etched surfaces as well as haptic structures.

The sol-gel layer is responsible for the structure of the subsequent layers. This means that a functional layer which is subsequently applied such as for example a metal layer or a lacquer layer preferably will adopt the surface structure of the sol-gel layer.

Preferably, the coating composition contains hydrolyzed and condensed epoxy- or methacrylate-functionalized alkoxysilanes as sol-gel precursors. Therefore, the sol-gel layer contains the hybrid-polymers originated from them. Particularly advantageous is the use of epoxide-functionalized alkoxysilanes, because with them the shrinkage of the structure is reduced which allows better structure accurateness.

When the sol-gel layers are prepared according to this invention, preferably they have an inorganic degree of cross-linking of higher than 70%, preferably higher than 80%. This results in the advantages according to the present invention, in particular with respect to the elasticity and the resistance of the layer. The inorganic degree of cross-linking is determined with the help of $^{29}$Si-NMR.

So that this can be achieved, preferably the coating composition should contain methyl-, ethyl- or phenyl-substituted alkoxysilanes during the production method. Alternatively, also further organically cross-linking components may be contained.

Preferably, the sol-gel layer contains a composite material being a reaction product of a polysiloxane with at least one alkoxysilane. With a production according to the present invention this composite has a degree of substitution of 0.5 to 1.5, preferably 0.7 to 1.5 and particularly preferably 0.8 to 1.3. The degree of substitution is the mean number of silicon-carbon bonds per silicon atom in the composite. The degree of substitution may be determined via $^{29}$Si-NMR.

Preferably, the sol-gel layer comprises the hybrid-polymer of alkoxysilane precursors, wherein as an alkoxysilane precursor in particular (3-glycidoxypropyl)triethoxysilane and (3-methacryloxypropyl)trimethoxysilane are preferable. Preferably, the polysiloxane added is a phenylmethylpolysiloxane.

The content of hydroxyl groups of this composite material is 1 to 5% by weight, preferably 1 to 4% by weight.

The silicon-carbon ratio (Si:C ratio) is the ratio of the amounts of substance of silicon to carbon in the composite material of the sol-gel layer. Preferably, this ratio is 20:1 to 1:5, in particular 10:1 to 1:2 and particularly preferably 7:1 to 2:1. This ratio may be determined via an elementary analysis.

Preferably, the organic degree of cross-linking of the sol-gel layer is higher than 30%, particularly preferably higher than 50%. This degree of cross-linking is determined by means of Raman measurement and, for example, is conducted via a measurement of the intensity of the band of the epoxy ring at 1269 cm$^{-1}$. As a comparison the band of the vibration belonging to $CH_2$ at 1299 cm$^{-1}$ is used.

Preferably, due to the preferable production method the sol-gel layer has a content of beta-OH of 0.01 to 100/mm, preferably 0.05 to 10/mm and in particular 0.1 to 2/mm. The measurement of the content of beta-OH is conducted according to the method described in WO 2009/998915. The layer thicknesses of the layers were between 10 and 50 µm.

The low content of beta-OH is directly connected with a low surface energy of the sol-gel layer. Therefore, the sol-gel layers according to the present invention have a low surface energy, about with a polar portion of preferably lower than 25 mN/m, in particular lower than 15 mN/m and a disperse portion of preferably lower than 40 mN/m, in particular lower than 35 mN/m. This effect results in a contact angle with respect to water of preferably higher than 50°, in particular higher than 75° and preferably higher than 85°, whereby the sol-gel layer is provided with hydrophobic properties and thus a certain dirt-repellent effect. Primarily, the reason for this effect is the sol-gel layer as such and not its optional structure, wherein the high degree of substitution of the Si—O network and the low porosity significantly contribute to this effect. By a stamped structure said effect may be increased in addition. In a particular embodiment a superhydrophobic and superoleophobic surface can be produced.

Preferably, the maximum mass loss of the sol-gel layer after a load of 300° C. for half an hour is 30% by weight, particularly preferably 15% by weight due to the high degree of substitution of the network.

According to the present invention the composites may comprise a plurality of substrates. With the method according to the present invention layers may be built on nearly any substrate. Since this invention allows the adjustment of the refractive index of sol-gel layers to the refractive index of the substrate by the targeted use of particles, even transparent composites may be obtained. This may advantageously be used in the coating according to the present invention of transparent substrates. Therefore, transparent substrates are particularly preferable. In one embodiment the substrate is selected from transparent plastics, such as polycarbonates, polyacrylates, polyolefins and cycloolefinic copolymers.

However, particularly preferable are inorganic substrates, since most often they have a better temperature resistance than organic substrates. Particularly preferable are soda-lime glasses, in particular iron-poor soda-lime glasses, borosilicate glasses, aluminosilicate glasses and glass ceramics, in particular transparent glass ceramics, as well as laminates of different glasses, glass ceramics and/or ceramics. The glasses may be chemically and/or thermally tempered and may have the form of a ring and/or may have a curved form. The glasses may be in the form of vials, ampoules or syringes.

Also the use of the described composites in micro-lens systems, pharmaceutical packages, light guide systems in the field of architecture, composite materials for illumination technique, uncoupling layers for OLEDs and uncoupling layers for LEDs, preferably on curved substrates is according to the present invention.

The method according to the present invention allows the direct application of the desired layers with or without surface structure onto a finished product.

At the same time, the sol-gel layers according to the present invention have a function as a barrier, in particular with respect to diffusion.

In special embodiments before the coating step a primer is applied onto the surface of the substrate.

In preferable embodiments a step of conditioning of the surface of the substrate is conducted.

In a further embodiment the sol-gel layer is provided with at least one functional layer. The functional layer may have an antistatic, hydrophobic, hydrophilic, oleophobic, photo-catalytic, thermo-catalytic, reflective, optically active, colored and/or electrically conducting design.

In a preferable embodiment the substrate with the sol-gel layer has a transmittance of >90% and an absorption of <5%, preferably <2%, particularly preferably <1% in a wavelength range of 300 to 800 nm and a layer thickness of 5 μm, preferably even 10 μm.

Preferably, the refractive index of a particular embodiment according to the present invention of the sol-gel layer is between 1.4 and 1.6. Preferably, it is 1.45 to 1.55. In a further embodiment according to the present invention the refractive index of the polysiloxane-modified sol-gel layer is between 1.6 and 1.7. Preferably, it is adjusted to the substrate and the difference to the refractive index of the substrate used is not higher than 0.05 points.

The modulus of elasticity of the layers according to the present invention after UV curing is 200 to 4,000 N/mm$^2$, preferably 300 to 3,000 N/mm$^2$, particularly preferably 500 to 2,000 N/mm$^2$.

The modulus of elasticity of the layers according to the present invention after thermal curing at 140 to 300° C. is 500 to 10,000 N/mm$^2$, preferably 750 to 6,000 N/mm$^2$, particularly preferably 1,250 to 5,000 N/mm$^2$.

In other words, preferably the modulus of elasticity of the sol-gel layers according to the present invention is 200 to 4,000 N/mm$^2$ or 500 to 10,000 N/mm$^2$. Preferably, in another preferable embodiment the modulus of elasticity is 500 to 4,000 N/mm$^2$ or >4,000 to 10,000 N/mm$^2$. The mechanical properties, in particular the Young's modulus of elasticity of the layers according to the present invention are preferably determined by the use of a nano-indenter respectively are calculated from the nano-indenter measurement. A person skilled in the art will know such methods from literature. The methods are in accordance with the model of Hertz, such as for example described of Q. Liao et al. in Mech. of Mat. 42 (2010) 1043-1047 or in Thin Solid Films 516 (2008) 1056 to 1062.

In a particular embodiment the used substrates, for example on the non-coated side, carry further decorative or functional layers, such as for example conductive transparent layers, conductive metallic layers, multilayer antireflection coatings, porous antireflection coatings, optical filter coatings, IR reflective coatings, antistick coatings, anti-fingerprint coatings, easy-to-clean coatings, barrier layers and/or colored ceramic enamel coatings.

In a preferable embodiment the structured sol-gel layer comprises a decorative layer for cover plates of glass, such as can be used for example in the field of household appliances or in the field of architecture (for indoor and outdoor use) or automotive industry or in the field of aircraft construction or mechanical engineering (for example elevators). The decorative layer is stamped into the sol-gel layer. In this case a cover plate is characterized in that it acts as a kind of faceplate. In prior art such faceplates are for example made of stainless steel.

Thus, according to the present invention the composite may be used in or as doors of a refrigerator, baking oven panes, steamers, cooking plates for gas usage, glass cutting boards, linings for TV sets or electronic devices, exhaust hoods and elevators. In this case structures can be incorporated into the sol-gel layer imitating the appearance of brushed metal or the surface of sandblasted and/or etched glass. Then, the respective structures can simply be used as a master piece to provide the above-described stamp die.

Normally, here statistic structures are used which have a depth of the structure of 40 nm to 10 μm. In the case of brushed stainless steel structures they are for example structures of brush marks of round or linear form having a depth of preferably up to 3 μm, particularly preferably up to a depth of the structure of 2 μm.

In a particular embodiment one or more layers having metallic appearance are applied onto the structured layer by a liquid coating method or a deposition method, such as for example sputtering or CVD, for achieving the optical appearance of stainless steel. In this case, these layers having metallic appearance may consist of metal or a semimetal or an organic and/or an inorganic lacquer. Preferably used are metal layers having a color point of stainless steel, chromium, aluminium, copper, platinum or rhodium. Preferably, for the deposition of a layer having metallic appearance the sputtering method and/or a lustre color and/or a pigmented sol-gel color and/or a pigmented or colored organic paint are used.

In this case the thickness of the layer having metallic appearance is between 50 and 500 nm, preferably between 60 and 200 nm. Preferably, a stainless steel target, a Cr target, a Cu target and/or an Al target are used for the production of the layers having metallic appearance via the sputtering method. In a particular embodiment the color point of the Cr layer is adjusted to the color point of stainless steel by suitable process management.

In a particular embodiment the layer having metallic appearance may be provided with several protective layers. Furthermore, in a preferable embodiment onto the layer having metallic appearance an organic, polysiloxane-based and/or sol-gel-based sealing layer may be applied. This e.g. may be an epoxy- and/or polyurethane-based scratch proof coating (BSH test>1,000 g).

Example 1

During Example 1, 0.06 mol of GPTES (glycidoxypropyltriethoxysilane) and 0.02 mol of TEOS (tetraethoxysilane) and 0.02 mol of PTEOS (phenyltriethoxysilane) were added into a vessel and hydrolyzed with 2.3 g of water in which 0.344 g of PTSH (para-toluene sulfonic acid) had been solved. After stirring for three hours the volatile reaction products were removed with a rotary evaporator. In 10 g of the hydrolyzate such obtained 5 g of a polysiloxane resin having a ratio of phenyl to methyl of 1.2/1 and a molecular mass of 2,000 to 7,000 and a content of $SiO_2$ of about 52% were solved.

Subsequently, 1.5 ml of a solution of 20% of the cationic photoinitiator Irgacure® 250 in 1-methoxy-2-propanol were added to the coating composition. Subsequently, the volatile components were removed with a rotary evaporator.

With the help of doctor knifes using a gap width of 90 μm between the coating roller system and the substrate surface a primary layer was applied on one side of a boro-float glass substrate. The primary layer was pre-cured under a UV lamp for 10 seconds (s). A silicone stamp die (PDMS) with microlens structure was applied onto the primary layer which still was in a malleable condition and subsequently said layer was hardened with the help of the UV lamp straight through the stamp die (exposure time: 5 min). After the removal of the stamp die the structure of the stamp die had been transferred into the primary layer. The final layer thickness of the first layer was about 25 μm.

After UV curing the sol-gel layer had a modulus of elasticity of 800 $N/mm^2$ +/−10% and after thermal curing at 200° C. for 1 hour (h) the modulus of elasticity was 2,000 $N/mm^2$ +/−10%.

Example 2

During Example 2, 0.06 mol of GPTES (glycidoxypropyltriethoxysilane) and 0.02 mol of TEOS (tetraethoxysilane) and 0.01 mol of MTEOS (methylthethoxysilane) and 0.01 DMDEOS (dimethyldiethoxysilane) were added into a vessel and hydrolyzed with 2.3 g of water in which 0.344 g of PTSH (para-toluene sulfonic acid) had been solved. After stirring for three hours the volatile reaction products generated were removed from the mixture with a rotary evaporator.

To 10 g of the hydrolyzate 8.5 g of a solution of 50% of a phenylpolysiloxane resin in ethanol were added.

Finally, 3 g of a solution of 20% of the cationic photoinitiator Irgacure® 250 in 1-methoxy-2-propanol were added to the coating composition. Subsequently, the volatile solvent was removed with a rotary evaporator at 80° C. and 100 mbar.

By means of screen printing using a 34 screen a primary layer having a thickness of about 40 μm was applied onto a soda-lime glass substrate. Subsequently, this layer was allowed to stand for 2 h at room temperature.

After the evaporation of the solvent the remaining primary layer was pre-cured under a UV lamp for 10 s. Subsequently, a structured silicone stamp die (PDMS) with a light guide structure was applied onto the primary layer which still was in wet condition and the layer was hardened with the help of the UV lamp straight through the stamp die (exposure time: 5 min). After the removal of the stamp die the structure of the stamp die had been transferred into the primary layer. The final layer thickness of the first layer was about 30 μm.

After UV curing the sol-gel layer had a modulus of elasticity of 1,200 $N/mm^2$ +/−10% and after thermal curing at 240° C. for 1 h the modulus of elasticity was 2,500 $N/mm^2$+/−10%

Example 3

During Example 3, 0.06 mol of GPTES (glycidoxypropyltriethoxysilane) and 0.02 mol of TEOS (tetraethoxysilane) and 0.01 mol of MTEOS (methyltriethoxysilane) and 0.01 DPDEOS (diphenyldiethoxysilane) were added into a vessel and hydrolyzed with 2.3 g of water in which 0.344 g of PTSH (para-toluene sulfonic acid) had been solved. After stirring for three hours the volatile reaction products generated were removed from the mixture with a rotary evaporator.

To 10 g of the hydrolyzate 8.5 g of a solution of 50% of a polysiloxane resin having a ratio of phenyl to methyl of 1.3/1, a molecular mass of 2,000 to 4,000, a content of $SiO_2$ of about 52% and a content of silanol groups of 6% by weight in butanol were added.

Finally, 3 g of a solution of 20% of the cationic photoinitiator Irgacure® 250 in 1-methoxy-2-propanol were added to the coating composition. Subsequently, the volatile solvent was removed with a rotary evaporator at 80° C. and 100 mbar.

By means of roll coating a primary layer having a thickness of about 150 μm was applied onto a soda-lime glass substrate. Subsequently, this layer was allowed to stand for 2 h at room temperature.

After the evaporation of the solvent the remaining primary layer was pre-cured under a UV lamp for 10 s. Subsequently, a structured silicone stamp die (PDMS) with a light guide structure was applied onto the primary layer which still was in wet condition and the layer was hardened with the help of the UV lamp straight through the stamp die (exposure time: 5 min). After the removal of the stamp die the structure of the stamp die had been transferred into the obtained sol-gel layer. The final layer thickness of the cured lacquer was about 60 μm.

After thermal curing at 230° C. for 1 h the modulus of elasticity of the sol-gel layer was 2,600 $N/mm^2$+/−10%.

Example 4

During Example 4, 0.08 mol of MPTES (methacryloxypropyltriethoxysilane) and 0.02 mol of TEOS (tetraethoxysilane) were added into a vessel and hydrolyzed with 1.44 g of water in which 0.344 g of PTSH (para-toluene sulfonic acid) had been solved. After stirring for three hours the volatile reaction products generated were removed from the mixture with a rotary evaporator.

To 10 g of the hydrolyzate 6.0 g of a solution of 75% of a polyester-modified polysiloxane in methoxypropylacetate and isopropanol were added. Finally, 1 g of the radical photoinitiator Irgacure® 819 was added to the coating composition.

By means of screen printing using a 54 screen a primary layer having a thickness of about 20 μm was applied onto a soda-lime glass substrate. Subsequently, this layer was dried for 1 h at about 60° C. by means of an IR lamp.

Subsequently, a structured silicone stamp die (PDMS) with an optical lens structure was applied onto the primary layer which still was in wet condition and the layer was hardened with the help of the UV lamp straight through the stamp die (exposure time: 2 min). After the removal of the stamp die the structure of the stamp die had been transferred into the obtained sol-gel layer. The final layer thickness of the cured lacquer was about 10 μm.

After UV curing the modulus of elasticity of the sol-gel layer was 3,360 N/mm$^2$ +/−10% and after thermal curing at 280° C. for 0.2 h the modulus of elasticity was 4,200 N/mm$^2$+/−10%.

Example 5

During Example 5, 0.08 mol of MPTES (methacryloxypropyltriethoxysilane) and 0.018 mol of TEOS (tetraethoxysilane) were added into a vessel and hydrolyzed with 1.15 g of water in which 0.21 of PTSH (para-toluene sulfonic acid) had been solved. After stirring for three hours the volatile reaction products generated were removed from the mixture with a rotary evaporator.

Then, to 10 g of the hydrolyzate 15 g of a solution of 75% of a polyester-modified polysiloxane in methoxypropylacetate and isopropanol were added. Subsequently, to that were added 30 g of a solution of 20% by weight of highly refractive nanoparticles (TiO$_2$, anatase, 16 nm) in propanol.

Finally, 1 g of the radical photoinitiator Irgacure® 819 was added to the coating composition. Subsequently, the volatile solvent was removed at RT and 30 mbar with a rotary evaporator.

By means of screen printing a primary layer having a thickness of about 40 μm was applied onto a soda-lime glass substrate. Subsequently, this layer was dried for 1 min at 60° C. by means of an IR lamp.

Subsequently, a structured silicone stamp die (PDMS) with an optical line grid structure was applied onto the primary layer which still was in wet condition and the layer was hardened with the help of a UV lamp straight through the stamp die (exposure time: 4 min). After the removal of the stamp die the structure of the stamp die had been transferred into the obtained sol-gel layer. The final layer thickness of the cured lacquer was about 20 μm and the refractive index of the lacquer was about 1.6.

After UV curing the modulus of elasticity of the sol-gel layer was 2,100 N/mm$^2$ +/−10% and after thermal curing at 270° C. for 0.2 h the modulus of elasticity was 2,800 N/mm$^2$+/−10%.

Example 6

During Example, 6, 0.08 mol of MPTES (methacryloxypropyltriethoxysilane) and 0.018 mol of TEOS (tetraethoxysilane) were added into a vessel and hydrolyzed with 2.3 g of water in which 0.21 g of PTSH (para-toluene sulfonic acid) had been solved. After stirring for three hours the volatile reaction products generated were removed from the mixture with a rotary evaporator.

To 10 g of the hydrolyzate 5.0 g of a solution of 75% of a polyester-modified polysiloxane in a mixture of methoxypropylacetate and isopropanol and 0.5 g of glycerol-1,3-dimethacrylate urethane triethoxysilane were added. Finally, 1 g of the radical photoinitiator Irgacure® 819 was added to the coating composition.

By means of screen printing using a 54 screen a primary layer having a thickness of about 20 μm was applied onto a soda-lime glass substrate. Subsequently, this layer was dried for 1 min at about 60° C. by means of an IR lamp.

Subsequently, a structured silicone stamp die (PDMS) with an optical lens structure was applied onto the primary layer which still was in wet condition and the layer was hardened with the help of the UV lamp straight through the stamp die (exposure time: 2 min). After the removal of the stamp die the structure of the stamp die had been transferred into the obtained sol-gel layer. The mean final layer thickness of the cured lacquer was about 14 μm.

After UV curing the modulus of elasticity of the sol-gel layer was 3,500 N/mm$^2$ +/−10% and after thermal curing at 280° C. for 0.2 h the modulus of elasticity was 4,800 N/mm$^2$+/−10%.

What is claimed is:

1. A composite comprising:
a substrate; and
a structured sol-gel layer,
wherein the structured sol-gel layer has a modulus of elasticity of 200 to 10,000 N/mm$^2$ and comprises a reaction product of at least one alkoxysilane with at least one polysiloxane, wherein the at least one polysiloxane has a mean molecular weight of at least 1,500 and at most 300,000 g/mol, and wherein the least one polysiloxane is a polyester-modified polvsiloxane.

2. The composite according to claim 1, wherein the substrate is a material selected from the group consisting of glass ceramic, glass, ceramic, and a polymer plastic.

3. The composite according to claim 1, wherein the structured sol-gel layer is a stamped layer.

4. The composite according to claim 3, wherein the stamped layer comprises a structure with a depth of 2 μm to 200 μm.

5. The composite according to claim 1, wherein the structured sol-gel layer comprises a content of SiO$_2$ of 10 to 70% by weight.

6. The composite according to claim 1, wherein the structured sol-gel layer has an inorganic degree of cross-linking of higher than 70%.

7. The composite according to claim 1, wherein the structured sol-gel layer comprises a content of beta-OH of 0.01 to 100 /mm.

8. The composite according to claim 1, wherein the least one polysiloxane has a degree of substitution of 0.5 to 1.5.

9. A composite comprising:
a substrate; and
a structured sol-gel layer,
wherein the structured sol-gel layer has a modulus of elasticity of 200 to 10,000 N/mm$^2$ and comprises a reaction product of at least one alkoxysilane with at least one polysiloxane, wherein the at least one polysiloxane has a mean molecular weight of at least 1,500 and at most 300,000 g/mol, and wherein the structured sol-gel layer comprises a content of beta-OH of 0.01 to 100 /mm.

10. The composite according to claim 9, wherein the substrate is a material selected from the group consisting of glass ceramic, glass, ceramic, and a polymer plastic.

11. The composite according to claim 9, wherein the structured sol-gel layer is a stamped layer.

12. The composite according to claim 11, wherein the stamped layer comprises a structure with a depth of 2 μm to 200 μm.

13. The composite according to claim 9, wherein the structured sol-gel layer comprises a content of SiO$_2$ of 10 to 70% by weight.

14. The composite according to claim 9, wherein the structured sol-gel layer has an inorganic degree of cross-linking of higher than 70%.

15. The composite according to claim 9, wherein the least one polysiloxane has a degree of substitution of 0.5 to 1.5.

16. The composite according to claim 9, wherein the least one polysiloxane is a polyester-modified polysiloxane.

* * * * *